United States Patent [19]

Wilkinson

[11] 4,092,690
[45] May 30, 1978

[54] PROTECTIVE RELAY CIRCUIT PROVIDING A COMBINED DISTANCE AND OVERCURRENT FUNCTION

[75] Inventor: Stanley B. Wilkinson, Havertown, Pa.

[73] Assignee: General Electric Company, Philadelphia, Pa.

[21] Appl. No.: 764,302

[22] Filed: Jan. 31, 1977

[51] Int. Cl.² .............................................. H02H 3/28
[52] U.S. Cl. ...................................... 361/80; 361/83; 361/87
[58] Field of Search ...................... 361/79, 80, 83, 85, 361/86, 87, 88, 89, 187

[56] References Cited

U.S. PATENT DOCUMENTS

| 3,277,345 | 10/1966 | Waldron | 361/80 |
| 3,374,399 | 3/1968 | Dewey | 361/80 |
| 3,898,530 | 8/1975 | Perez-Cavero | 361/80 X |
| 3,938,007 | 2/1976 | Boniger et al. | 361/80 |
| 4,034,269 | 7/1977 | Wilkinson | 361/79 |

Primary Examiner—Harry E. Moose, Jr.
Attorney, Agent, or Firm—William Freedman; Carl L. Silverman; Michael F. Petock

[57] ABSTRACT

The protective relay circuits herein provide a combined distance and overcurrent type of function. The protective relay circuit includes an a-c level detector or bipolar threshold circuit to which the quantity I ($Z_R - Z_F$) is applied. The quantity I is the current in the line, $Z_R$ is a replica or reference impedance corresponding to the lines being protected and $Z_F$ is the line impedance to the fault from the relay measuring point. $IZ_F$ is equal to V, the voltage input to the relay. An output is provided from the a-c level detector only when the quantity I ($Z_R - Z_F$) exceeds a predetermined value. The output of the level detector is compared in a coincidence circuit, or AND gate, with a polarizing signal. The detection of coincidence for a selectable predetermined time period, as measured by a characteristic timer, results in an output signal for use in controlling operation of the trip coil of the circuit breaker. The protective relay circuit may be used on series-capacitor compensated lines as well as on uncompensated lines. When the protective relay circuit is used on a compensated line, the a-c threshold level of the level detector is set to be a function of the breakdown voltage of the spark gap protecting the series compensating capacitor.

24 Claims, 8 Drawing Figures

PROTECTIVE RELAY CIRCUIT PROVIDING A COMBINED DISTANCE AND OVERCURRENT FUNCTION

BACKGROUND OF THE INVENTION

The present invention relates to protective relay circuits, and more particularly relates to a novel protective relay which may be considered to be a combination distance and overcurrent relay which provides significant advantages on both compensated and uncompensated lines.

Distance relays and static distance relays are well known in the art of protective relaying. For example, reference may be had to U.S. Pat. No. 3,374,399-Dewey and the patents cited therein. Further discussion of protective relaying by means of distance relays may be had by reference to the Art and Science of Protective Relaying, Mason, published by John Wiley & Sons, Inc. (1956). It is well known in the relay art that protective relays have a tendency to pick up for faults farther away than expected under certain conditions. This tendency is well known in the relay art as "overreach". The present invention substantially solves the problem of overreaching where there are series capacitors in the protected line section and also solves the problem of incorrect directional signalling when the series capacitors are located behind the relay location.

In the application of distance relays, the voltage and current in the line serve as inputs. Effectively, the voltage to current ratio is utilized to obtain a signal representative of the impedance from the protective relay sensing means to a fault location. If this signal representative of an impedance value indicates a fault within a predetermined distance of the relay monitoring circuitry, a signal is developed for controlling operation of the circuit breaker trip coil. Problems in the form of the detection of false fault condition signals have arisen when an open circuit has occurred in the circuitry providing the voltage signal. The voltage signal, which is a signal proportional to the line current times the impedance to the fault, acts as a restraining signal restraining the operation of the relay. When this signal disappears, due to an open circuit condition in the monitoring circuitry, such as a blown fuse or the like in the potential supply, the distance relay circuitry may provide a signal indicative of a fault condition. The present invention eliminates this possibility where the load current has not exceeded normal values.

In the past, protective relaying by means of distance relays suffered from a serious dilemma where a series capacitor or capacitors is used in the line for compensation purposes. For example, if a line had an impedance of 10 ohms and a compensating capacitive reactance of −5 ohms, it was necessary to set the reference or replica impedance of the line to a much smaller value than the difference between the line impedance and the capacitor impedance, 5 ohms, or else the distance relay had to be designed to operate very slowly to avoid substantial transient overreach. A further problem occurs where series capacitors are used in a location just behind the relay, that is, in the non-tripping direction. If a fault occurred near the capacitor but on the opposite side to the relay location, there was a good probability that the distance relay would produce an undesired trip output. The present invention also provides a solution to both of these problems. However, the latter problem may be solved by blocking the tripping relay by the prior operation of a blocking relay which looks in the non-tripping direction.

It is well known in the protective relaying art that it is essential to trip the circuit breaker more quickly for faults which occur near the generating source, such faults being referred to as close-in faults. The present invention enables the tripping of the circuit breaker to be effected more quickly on close-in faults thereby enabling the removal of the line containing the faults before it pulls a generator out of step or results in other significant undesirable results.

SUMMARY OF THE INVENTION

The present invention provides a number of significant advantages over the prior art, inter alia, it provides a means for quickly detecting substantial faults within a length of compensated line without the undesired effect of picking up faults in adjacent lines or succeeding buses.

Another advantage of the present invention is that false fault condition signals are not generated if an open circuit occurs in the voltage sensing circuitry as long as the line current I does not substantially exceed its normal value. In conventional distance relays, the distance relay is operated when the quantity $(IZ_R - IZ_F)$ increases above zero. If $IZ_F$ goes to zero due to an open circuit in the voltage sensing circuit, the distance relay can be triggered as the value $IZ_R$ would be substantially in excess of zero. In the present invention, an a-c level detector or bi-polar threshold circuit is provided which may be set so that there is no output when the input is equal to $IZ_R$ so long as the value of line current I is not substantially in excess of normal load or line current.

A further advantage of the present invention is that all input signals $(IZ_R - IZ_F)$ are fed to a bi-polar threshold circuit or alternating current level detector. The bi-polar threshold circuit does not produce an output and a signal is not fed to the means for causing operation of the circuit breaker unless the quantity $(IZ_R - IZ_F)$ exceeds a predetermined threshold value, which may be selectably adjusted. This selectable adjustment of the conditions under which the protective relay circuit will produce an output provides advantages in numerous applications in addition to those discussed above.

Still another advantage of the present invention is that it can provide rapid generation of a fault signal for close-in faults. In other words, for faults which occur right in front of or close to the relay sensing circuitry, the fault signal may be generated very quickly. Use of the a-c level detector in accordance with the present invention enables the setting of shorter times for the required coincidence detection period on the characteristic timer, for example, times substantially less than 90 electrical degrees may be set for the coincidence detection period. The a-c level detector or bi-polar threshold circuit is set so that there will be no output signal for load currents less than a predetermined normal load or line current. In the absence of the use of the present invention, the characteristic timer would have to be set for at least 90 electrical degrees and possibly 120 electrical degrees, in order to avoid false operation under heavy load conditions. The longer electrical degree comparison times caused a greater delay between the sensing of the fault condition and the generation of the actual fault signal. The present invention enables the shortening of the time delay.

Briefly, in accordance with the present invention, a relay circuit is provided for generating a signal for controlling the trip coil of a circuit breaker protecting an alternating current power transmission line. A first and second means is provided for coupling to the line. The first coupling means is responsive to line voltages for developing reference voltages representative of the line voltages. The second coupling means is responsive to line currents for developing representative voltages related to the line current by a predetermined constant impedance. All of the representative voltages have a certain phase relation with respect to electrical power flow on the line. Summing means is provided for summing the representative voltage related to the line current by a predetermined constant impedance or replica impedance ($Z_R$) and an inverted reference voltage ($-IZ_F$) representative of the line voltage to the fault. The summing means may be considered to be a difference circuit means for producing an output signal ($IZ_R - IZ_F$) where I is the line current, $Z_R$ is the preselected constant reference or replica impedance, and $Z_F$ is the line impedance from the relay to a possible fault. The output of the summing means or difference circuit means is fed to an a-c level detector or a bi-polar threshold circuit means. The a-c level detector means provides a signal output only when the output of the summing means exceeds a selected predetermined value. A voltage polarizing circuit or filter circuit is provided to provide a voltage polarizing signal in response to said reference voltage signal representative of a line voltage. The voltage polarizing signal and the output of said threshold means are fed to a coincidence detector means to generate a fault signal output. A fault signal output can be generated only where the quantity ($IZ_R - IZ_F$) exceeds a predetermined threshold value of the a-c level detector.

The fault signal output of the coincidence detector means is usually fed to a characteristic timer to provide an output only when coincidence has been detected for a sufficiently long period of time, such as 90 electrical degrees of the 60 hertz alternating current power. The output of the characteristic timer is usually fed to a trip control circuit for energization of the circuit breaker coil. The setting of the threshold level of the threshold means enables adjustment of the characteristic timer for smaller settings of coincidence, such as 60 electrical degrees instead of 90 electrical degrees. This enables generation of a fault signal much more rapidly, which is especially important on close-in faults. The threshold level of the threshold means may be set so that it does not produce an output for normal values of load current (I) times the selected constant impedance $Z_R$, thereby allowing the selection of shorter coincidence times by the characteristic timer in order to produce a fault signal output.

The threshold means also enables the detection of faults within a series capacitor compensated line without the detection of faults beyond the line on adjacent buses. This is enabled by the use of the threshold means being set to trigger at a value which corresponds to a function of the spark gap flash-over or break-down voltage of the spark gaps which are provided across the capacitors for over-voltage protection.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
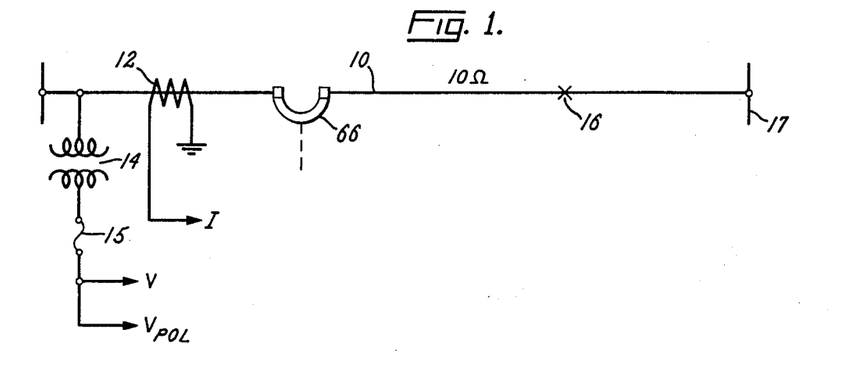
FIG. 1 is a schematic diagram of an uncompensated alternating current power transmission line.

The present invention may be viewed as a combination of a distance relay and an overcurrent relay in a manner that substantially enhances its performance over that obtained by the use of a separate distance relay and a separate overcurrent relay. Basically, referring to FIG. 1, there is shown an alternating current power transmission line 10 having a means 12 for sensing the current I in a line and a means 14 for sensing the voltage V on the line. As is well known to those skilled in the protective relaying art, current sensing means 12 may be a current transformer and voltage sensing means 14 may be a step down transformer. However, it is understood that other suitable sensing means may be used. There is shown in FIG. 1 a fault X located at 16 along 10. During a fault condition, the voltage V is equal to $IZ_F$ where $Z_F$ is the impedance of the line from the fault 16 to current sensing means 12 and voltage sensing means 14. It is assumed for the purposes of discussion here that current sensing means 12 and the voltage sensing means 14 are located at substantially the same location on the line. It is understood that the transmission line diagrams in the figures discussed herein are not drawn to scale.

The impedance of the total length of the line in FIG. 1 is designated as $Z_L$ and may be, for example, given the value of 10 ohms. The value $Z_R$ is a preselected constant impedance value which may be designated as a replica or reference impedance of the line. When the present invention is employed as a direct tripping function, i.e. functioning without additional supervision, this impedance value is usually selected to be equal to or slightly less than the impedance $Z_L$ in order for the distance relay to restrict its operation to faults within the line to be protected. For example, the value $Z_R$ may be selected to be 10 ohms where the line impedance $Z_L$ is 10 ohms in order to provide assurance that only faults within the line will be detected. However, some applications will permit setting $Z_R$ larger than $Z_L$ without fear of detecting faults external to the protected line.

Figure 3:
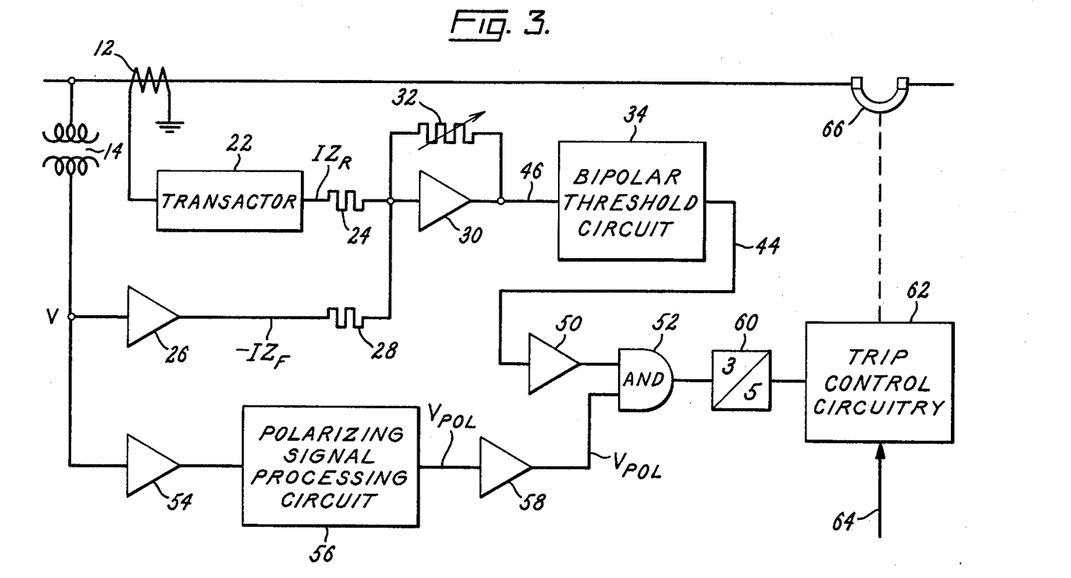
FIG. 3 is a schematic diagram, partially in block diagram form, of a protective relay circuit providing a combined distance and overcurrent function in accordance with the present invention.

Referring now to FIG. 3, there is shown a schematic diagram, partially in block diagram form, of a protective relay circuit in accordance with the present invention. A current sensing means 12 is provided which may be a current transformer. The output of the current sensing means is applied to a transactor 22 which provides an output to resistor 24 which is proportional to the current times a preselected constant impedance $Z_R$. Such transactor devices are well known in the art. The secondary voltage output of the transactor is related to the primary current by a complex proportionality constant or vector operator known as the transfer impedance Z of the transactor. The output voltage of transactor 22 is therefore equal to $IZ_R$ where the transfer impedance of the transactor is selected to be equal to $Z_R$. Further detailed discussion of a transactor may be had by reference to U.S. Pat. No. 3,374,399-Dewey which is assigned to the assignee herein, and the teachings of which are incorporated herein by reference.

The voltage sensing means 14 applies a voltage to inverting amplifier 26. Inverting amplifier 26 inverts the voltage signal ($V = IZ_F$) and applies it to resistor 28. However, it is understood that other suitable methods of obtaining the voltage inversion may be employed thereby avoiding the need for inverting amplifier 26 as is well known to those skilled in the art, such as for example by suitable connections of the transformer. The voltage applied to resistor 28 may be designated $-IZ_F$. The voltage applied to resistor 28 is proportional to the product of the current in the line and the impedance from the sensing point to a fault location, when a fault exists. The signals $IZ_R$ and $-IZ_F$ are summed at the input of operational amplifier 30 to produce the difference signal output ($IZ_R - IZ_F$). A difference amplifier, instead of the disclosed amplifier 30, could also be used to create this signal output without using inverting amplifier 26. Operational amplifier 30 is provided with a variable feedback resistance 32 which may be used to selectively adjust the gain of operational amplifier 30.

Figure 4:
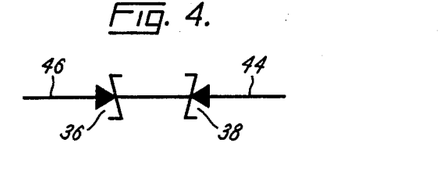
FIG. 4 is a schematic diagram of one embodiment of a bi-polar threshold circuit as shown in FIG. 3 in accordance with the present invention.
Figure 5:
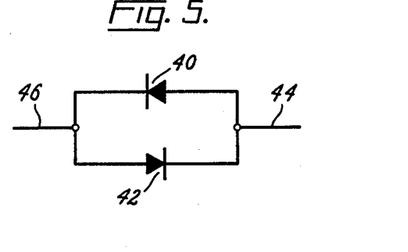
FIG. 5 is a schematic diagram of an alternative embodiment of a bi-polar threshold circuit as shown in FIG. 3.

The output of operational amplifier 30 is applied to a bi-polar threshold circuit or alternating current level detector 34. The bi-polar threshold circuit 34 may be a series connected back-to-back pair of zener diodes, such as zener diodes 36 and 38 shown in FIG. 4. Alternatively, the bi-polar threshold circuit 34 may be a pair of inverse parallel connected diodes such as diodes 40 and 42 shown in FIG. 5. In the case of the inverse parallel connected diodes 40 and 42, there is no output from the bi-polar threshold circuit on line 44 until the input exceeds the forward voltage drop of one of the diodes 40 or 42, depending upon the instantaneous polarity of the input on line 46. Greater flexibility and choice of threshold level may be provided by the use of zener diodes 36 and 38 as shown in FIG. 4. In the case of FIG. 4, no output appears on output line 44 until the a-c voltage on input 46 exceeds the breakdown voltage of the zener diodes. Of course, various zener diode breakdown potentials may be selected and various combinations of zener diodes and/or regular diodes may be used to select the desired threshold voltage. Further discussion may be had of a bi-polar threshold circuit by reference to United States Patent Application Ser. No. 640,308, filed by the inventor herein and assigned to the assignee herein, which is now U.S. Pat. No. 4,034,269; the teachings of which are incorporated herein by reference.

The output of bi-polar threshold circuit 34 which appears on line 44 is applied to a squaring amplifier 50 prior to being applied to one terminal of coincidence detector or AND gate 52.

Voltage sensing means 14 also applies an input to amplifier 54. The output of amplifier 54 is applied to a polarizing signal processing circuit which is basically a filtering circuit which produces a voltage polarizing signal at its output as is well known in the art of distance relaying. Further discussion of polarizing signal processing circuits may be had by reference to the aforementioned application of the inventor herein, and particularly to FIG. 7 of the aforementioned application. The circuitry shown in FIG. 7 of the aforementioned application may be used as the polarizing signal processing circuitry 56. However, other suitable circuitry may be used. The output of the polarizing signal processing circuit 56 is fed to squaring amplifier 58. The output of the squaring amplifier 58 is voltage polarizing signal $V_{POL}$ which is comprised of rectangular pulses of alternating polarity and which has a predetermined fixed relationship with the voltage V. The voltage polarizing signal output $V_{POL}$ of the squaring amplifier 58 is indicative of the direction of the fault location with respect to the relay. The output of squaring amplifier 58 is fed to a second input of coincidence detector or AND gate 52. The output of AND gate 52 is fed to a characteristic timer 60. The characteristic timer 60 provides an output when coincidence has been detected by AND gate 52 for a minimum predetermined time duration which corresponds to the number of milliseconds indicated in the left triangle of timer 60. The output of characteristic timer 60 is maintained for the number of milliseconds specified in the right triangle. For example, as shown in FIG. 3, no output would be supplied to the trip control circuit 62 until AND gate 52 detected coincidence on its inputs for a period of three milliseconds. The output of characteristic timer 60, once triggered, would be maintained for five milliseconds, as indicated by the 5 in the triangle on the right in characteristic timer 60.

The output of characteristic timer 60 is provided as one tripping input to trip control circuitry 62. Trip control circuitry 62 may receive other inputs on line 64, such as from pilot channel receivers. Assuming that trip control circuitry 62 is receiving any other necessary signals, the output of the characteristic timer 60 will trigger trip control circuitry 62 causing the opening of circuit breaker contacts 66. Components 60 and 62 taken together may be considered to be coincidence responsive means which receives a coincidence output signal from AND circuit 52, and is operative, when enabled by an input on line 64, to effect operation of a circuit breaker trip coil (not shown) in response to a coincidence signal output of a predetermined minimum duration as determined by characteristic timer 60.

It may be noted that there is no alternate path around bi-polar threshold circuit 34, and as a result of this, no input signal is supplied to amplifier 50 if the difference signal does not exceed the predetermined threshold value. Therefore, the protective relay circuit of the present invention permits the production of an effective coincidence signal output only if the difference signal exceeds the predetermined threshold value of the bi-polar threshold circuit or alternating current level detector 34.

In operation, the protective relay circuits of the present invention are operated when the difference signal output of summing circuit 30 exceeds a predetermined value. The output of summing amplifier means 30 is proportional to the difference between the product of the line current (I) and a selected reference or replica impedance ($Z_R$) and the product of the line current (I) and the line impedance to a possible fault ($Z_F$). It is understood that the summing to produce this difference signal may be achieved in various ways well known to those skilled in the art. For example, the difference signal may be achieved by applying one of the signals to the inverting input of an operational amplifier and the other signal to a non-inverting input of an operational amplifier. The output will be representative of the difference between the two input signals. Another method is as disclosed in FIG. 3 in which the signal corresponding to line voltage is inverted by inverting amplifier 26 and then summed in a resistance network comprised of resistors 24 and 28. Other suitable methods of summing these signals to produce a difference signal will be apparent to those skilled in the art.

The quantity ($IZ_R - IZ_F$) may be rewritten as $I(Z_R - Z_F)$. In conventional distance relays, the quantity $Z_F$ may be considered to be a restraining quantity, restraining the relay from operating. Normally, in the absence of a fault condition within the line being protected, the quantity $Z_F$ is substantial as it includes line impedance plus load impedance. If the quantity $IZ_F$ goes to zero due to a fault condition in the protective relaying circuitry, such as the opening of fuse 15, the restraining quantity $IZ_F$ disappears. In the assumed conventional relay, the quantity $IZ_R$ is then applied unrestrained and may cause operation of the relay. In accordance with the present invention, the gain of summing amplifier 30, as adjusted by variable resistor 32, and the selection of components in bi-polar threshold circuit or alternating current level detector 34 may be selected so that there is no output from bi-polar threshold circuit 34 on line 44 until the quantity $IZ_R$ exceeds normal value, or in other words, since $Z_R$ is fixed, until the current I exceeds normal load current values. Maximum normal load current may be considered a parameter of the power line.

Figure 2:
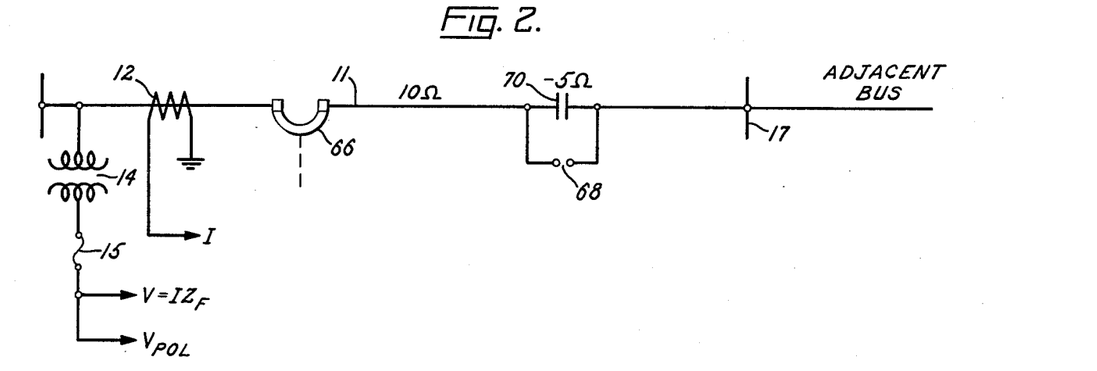
FIG. 2 is a schematic diagram of a series capacitor compensated alternating current power transmission line.

In operation in protecting series capacitor compensated lines, it is highly desirable to be able to trip the circuit breaker for faults occurring within the line, for example, to the left of point 17 on line 11 in FIG. 2, and to discriminate against faults occurring on an adjacent bus, for example, points to the right of point 17 on line 11. In other words, it is desirable to prevent the protective relay from "overreaching". The key element here is the capacitive voltage, which may be referred to as $IX_C$, which has a maximum value established by the breakdown potential of spark gap 68 connected across series compensating capacitor 70. In the case of a series capacitor compensated line, the difference quantity ($IZ_R - V$) becomes the quantity ($IZ_R - IZ_F$) where $Z_F$ is a function of the line impedance and the capacitive reactance of capacitor 70 depending upon where in a line the fault occurs. Assuming a fault occurs at the end of the line to be protected or in other words at point 17 along line 11, the quantity ($IZ_R - IZ_F$) becomes ($IZ_R - IZ_L + IX_C$), which simplifies to ($IX_C$), since $IZ_R$ and $IZ_L$ cancel out, assuming $IZ_R$ is selected equal to $IZ_L$. Since it is not desired that the relay trip for faults occurring external to the protected line, the alternating current level detector or bi-polar threshold circuit 34 is set to trigger on a voltage corresponding to the maximum value of the voltage $IX_C$, which is the breakdown voltage of spark gap 68 another power line parameter. The threshold level of bi-polar threshold circuit 34, as adjusted by variable resistor 32 which adjusts the gain of amplifier 30 and also by the selection of diode and/or zener diode components in bi-polar threshold circuit 34, is selected to be preferably equal a value corresponding to to the maximum voltage permitted across capacitor 70. The maximum voltage permitted across capacitor 70 is determined by spark gap 68. However, it is understood by those skilled in the art, that the setting of the level detector or bi-polar threshold circuit may be a function of the maximum voltage across capacitor 70, which may for example be 95% or 105% of the maximum voltage across capacitor 70. Of course, other appropriate percentages or functions of the maximum voltage across capacitor 70 may be utilized.

It is understood that, prior to this invention, it was undesirable to apply a very fast direct tripping distance relay on compensated lines because the impedance seen by a fault at the remote bus was a complex quantity based on both the steady state and transient voltages and currents. Although certain faults remote from the protective relay circuit apparatus but within the protected line section may not be detected due to a particular setting of threshold level in the protective relaying circuitry, the use of the present invention provides the advantage of being able to detect severe close-in faults quickly. The ability to detect severe close-in faults quickly, when coupled with the ability of other protective relays to detect the above referred to remote faults, is very important in maintaining system stability.

As noted above, preferably, the bi-polar threshold circuit 34 is adjusted to provide an output only when the line voltage exceeds the maximum value of $IX_C$, which is the breakdown voltage of spark gap 68 across capacitor 70. This means that faults will not be detected on line 11 of FIG. 2 beyond point 17. The quantity ($IZ_R - V$) becomes in general ($IZ_R - IZ_F + IX_C$) where $Z_F$ is the line impedance to the fault. The quantity $IX_C$ may be zero if the fault occurs on the relay side or source side of capacitor 70. This allows tripping for close-in faults where the quantity ($IZ_R - IZ_F$) exceeds the setting of the threshold circuit. This quantity will exceed the threshold setting where there are severe close-in faults.

The present invention may be used to provide protective relay circuitry which opens the line circuit breaker very quickly for close-in faults in order to enhance the security of the overall power system. The present invention enables the tripping of the circuit breaker very rapidly by allowing the characteristic timer to be set for tripping of the circuit breaker upon the detection of shorter coincidence times, such as for example, 60 electrical degrees rather than 90 or 120 electrical degrees. The lower setting on the characteristic timer is made possible by reason of the level detector or threshold detector which prevents tripping on maximum load current over the protected line. Without the level or threshold detector to prevent operation during maximum load current, a time delay of approximately 5.5 milliseconds or 120 electrical degrees, may be introduced into the system. By enabling the setting of the timer to detect coincidence for 60 electrical degrees, the time delay in the protective relaying circuitry is reduced from the 5.5 milliseconds to 2.75 milliseconds. This reduction in time delay can be a significant advantage in preventing instability upon the occurrence of a severe close-in fault, particularly in those applications where "one cycle" breakers are relied upon to maintain system stability.

Figure 6:
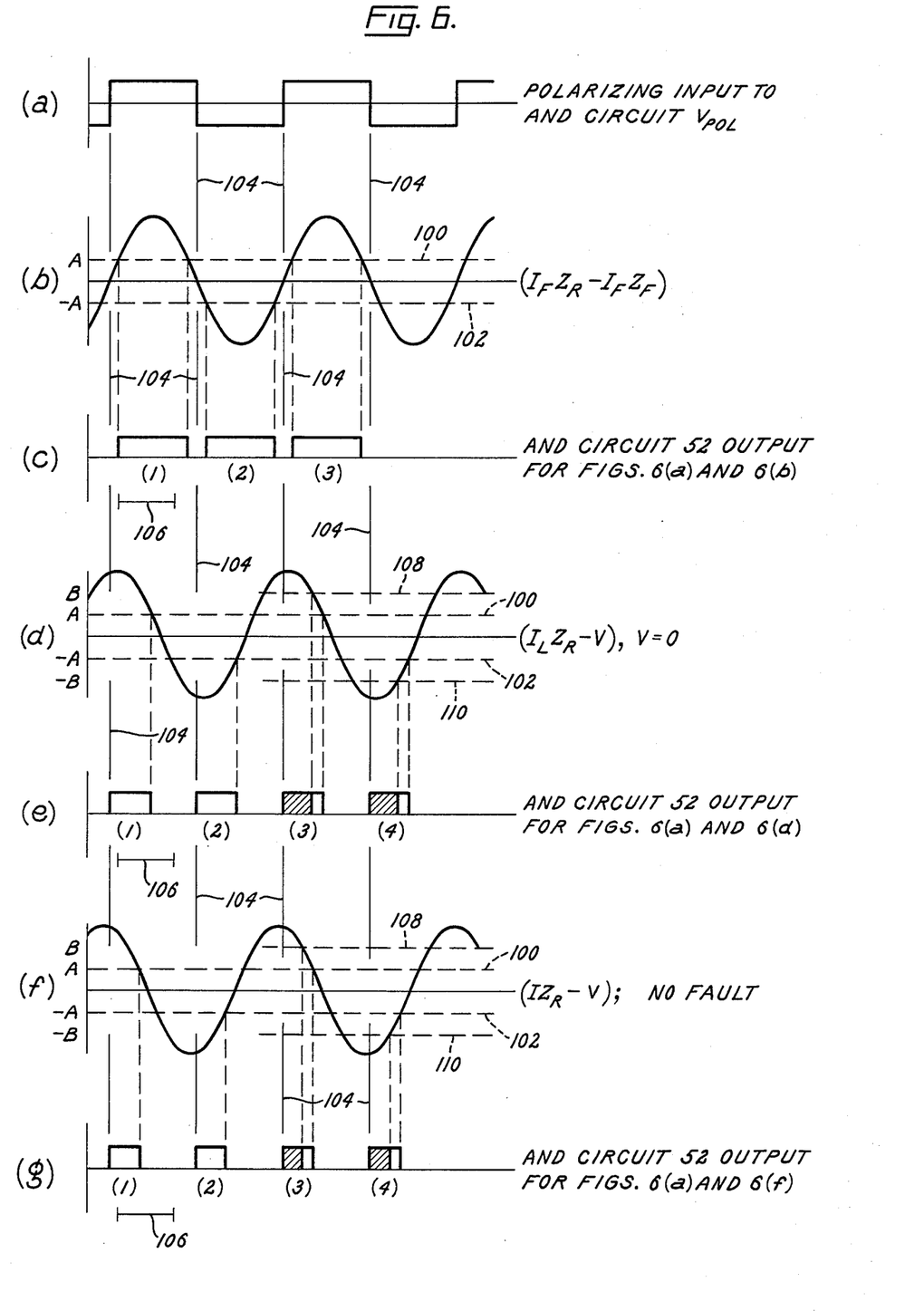
FIG. 6 is a set of electrical signal waveforms present in the circuit of FIG. 3 during operation including waveforms illustrating the effect on the coincidence or AND circuit output signal resulting from varying the threshold level setting of the bi-polar threshold circuit.
Figure 7:
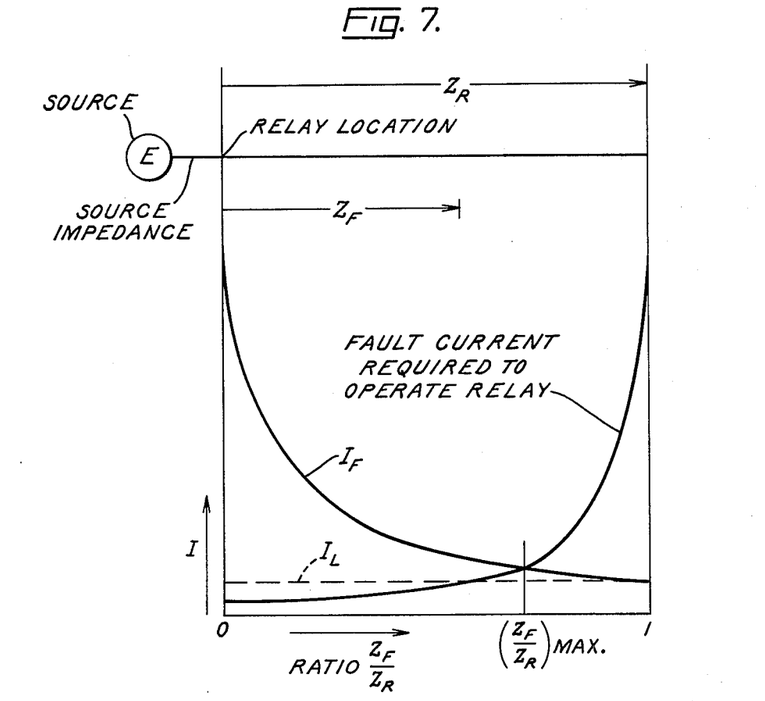
FIG. 7 is a graph on which the fault current $I_F$ and the current required to operate the protective relay are plotted against the ratio ($Z_F/Z_R$), which is the ratio of fault impedance $Z_F$ to replica impedance $Z_R$.
Figure 8:
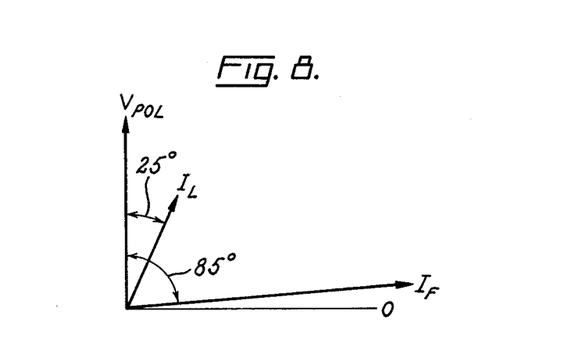
FIG. 8 is a phasor diagram illustrating typical phase relationships between the voltage polarizing signal $V_{POL}$, the load current $I_L$ and the fault current $I_F$.

The operation of the protective relay circuit of the present invention and particularly the relay circuit of FIG. 3 may be better understood by reference to FIGS. 6, 7 and 8. FIG. 8 is a phasor diagram which illustrates typical phase relationships between fault current $I_F$, maximum lagging load current $I_L$ and the voltage polarizing signal $V_{POL}$ for an aerial extra high voltage (EHV) line. In a phasor diagram, the magnitude of a quantity is represented by the length of its representative line, and the phase relationship is represented by the angle of the line measured from a given reference, which is usually the horizontal line marked zero in FIG. 8. The phase angle of the load current $I_L$ lagging $V_{POL}$ by approximately 25° is a typical worst case condition. From FIG. 8, it may be seen, for the case illustrated, that the phase angle of the line current I shifts upon the occurrence of a fault condition from lagging the voltage polarizing signal $V_{POL}$ by approximately 25° to lagging $V_{POL}$ by approximately 85°. This shift in the phase angle of the current is caused by the substantial drop in line voltage, during a fault condition which reduces or eliminates the effect of the shunt capacitance and the load impedance. The replica impedance $Z_R$ is selected to have a phase angle which leads $V_{POL}$ by approximately 85°, therefore the vector product of $I_F Z_R$ is substantially in phase with $V_{POL}$ during a fault condition. The vector product of the normal load current and the replica impedance $(I_L Z_R)$ is substantially out of phase with the voltage polarizing signal $V_{POL}$ from polarizing signal processing circuit 56.

The effects of the phase shift, the selection of different bi-polar threshold levels of bi-polar threshold circuit 34 and the selection of minimum coincidence detection times of characteristic timer 60 may be further better understood by reference to FIG. 6. The wave forms of FIG. 6 illustrate particularly the manner in which increasing the threshold settings of the alternating current level detector or bi-polar threshold circuit 34 produces a shorter coincidence pulse output from AND gate 52 for a predetermined difference signal $(IZ_R - IZ_F)$ input to bi-polar threshold circuit 34. The wave forms of FIG. 6 also demonstrate the manner in which the coincidence circuit precludes relay operation under no fault conditions if there is a loss of the monitoring potential, such as may be caused by fuse 15 being open or blown.

FIG. 6(*a*) is the polarizing signal input $V_{POL}$ to AND circuit 52. FIG. 6(*b*) is the difference signal $(IZ_R - IZ_F)$ under a fault condition, that is with $(I = I_F)$, with the bi-polar threshold levels shown by the dotted lines 100 and 102 at the levels A and —A. As may be seen from comparison of FIGS. 6(*a*) and 6(*b*), the difference signal $(I_F Z_R - I_F Z_F)$ is in phase with the voltage polarizing signal $V_{POL}$ during a fault condition. FIG. 6(*c*) is the coincidence output of AND circuit 52 with the polarizing input signal $V_{POL}$ of FIG. 6(*a*) and the difference signal of FIG. 6(*b*) during a fault condition $(I_F Z_R - I_F Z_F)$ for positive voltage values greater than A and negative voltage values greater than —A. The lines 104 are projections of the fall and rise points of the signal $V_{POL}$ as applied to AND gate 52, which are provided for convenience in viewing FIGS. 6(*a*) through 6(*g*).

FIG. 6(*d*) is the quantity $(I_L Z_R - V)$ with $V = 0$, such as may occur during normal line conditions when the monitoring voltage or relay voltage becomes zero due to an occurrence such as the blowing or opening of fuse 15. It may be noted that the voltage wave form of FIG. 6(*d*) leads the wave form of 6(*b*) by approximately 60° in accordance with FIG. 8. In other words, since there is no fault on the line, the current $I_L$ lags $V_{POL}$ by approximately 25° rather than lagging by the approximately 85° which occurs during a fault condition. It is understood that the phase angle values given in FIG. 8 and illustrated in FIG. 6 are approximate typical values, and are provided for the purpose of illustrating a concrete example, and are not intended to be limiting. The output of AND circuit 52 resulting from the polarizing input signal $V_{POL}$ of FIG. 6(*a*) and the signal $(I_L Z_R)$ generated under normal line current conditions with a loss of relay voltage as shown in FIG. 6(*d*) is shown in FIG. 6(*e*). Since the quantity $(I_L Z_R)$ of FIG. 6(*d*) is out of phase with the voltage polarizing signal $V_{POL}$ of FIG. 6(*a*) by approximately 60°, the output pulse (1) of FIG. 6(*e*) is substantially shorter than those of FIG. 6(*c*), even though the same bi-polar threshold levels A and —A are used. For example, if a characteristic timer 60 were set to produce an output only upon detection of a minimum duration coincidence output of AND gate 52 as shown by lines 106 in FIG. 6, an output would be generated by characteristic timer 60 in response to coincidence pulse (1) of FIG. 6(*c*) but would not be generated in response to coincidence pulse (1) of FIG. 6(*e*).

The coincidence duration may be further shortened for a predetermined difference signal $(IZ_R - IZ_F)$ by increasing the setting of the bi-polar threshold levels in the bi-polar threshold circuit 34. It is understood that increasing the threshold level of a bi-polar threshold device means that the absolute value of the positive and negative threshold levels are increased, or in other words that the positive threshold level is increased and the negative threshold level is made more negative. This is illustrated by dotted lines numbered 108 and 110 which correspond to levels of B and —B in FIG. 6(*d*). The coincidence output of AND gate 52 resulting from the higher threshold level settings of B and —B is shown by the cross-hatched area pulses (3) and (4) of FIG. 6(*e*). The longer pulse durations are also shown for the lower threshold levels A and —A. It is apparent that the duration of the coincidence outputs may be decreased in response to an increase in the phase shift of the difference signal with respect to the voltage polarizing signal $V_{POL}$ and/or by increasing the threshold level of the bi-polar threshold circuit. It is also apparent that the production or nonproduction of an output signal from characteristic timer 60 may be selectively determined by adjusting the bi-polar threshold levels and/or by the selection of the duration of the input signal required for characteristic timer 60 to produce an output signal to trip control circuitry 62.

FIG. 6(*f*) is the difference signal $(IZ_R - V)$ under no fault conditions, but with significant load current. In the example shown, this signal is substantially out of phase, approximately 100 degrees out of phase, with the voltage polarizing signal $V_{POL}$ of FIG. 6(*a*). The coincidence output of AND gate 52 in response to an input $V_{POL}$ as shown in FIG. 6(*a*) and the difference signal shown in FIG. 6(*f*) is shown in FIG. 6(*g*). As in the case of FIG. 6(*e*), the outputs shown in FIG. 6(*g*) are shorter in duration than the outputs of FIG. 6(*c*). The duration of the cross-hatched areas of output pulses (3) and (4) of FIG. 6(*g*) are shorter for the higher setting of the thresholds B and —B than in the case of the lower threshold settings of A and —A. It may be seen that the higher settings of threshold values for the alternating current level detector 34 will shorten the coincidence periods, enabling the characteristic timer 60 to be set for operation in response to shorter coincidence periods, thereby reducing the minimum time delay to operate the relay 66.

It is apparent that by setting the threshold level of the bi-polar threshold circuit so as to preclude operation where the line current does not exceed normal maximum load current values, the characteristic timer may be set to produce an output when a coincidence signal is present on its input for as little as 60 electrical degrees. This provides very fast detection for close-in faults. On the other hand, the characteristic timer may be set for substantially longer periods of coincidence, such as 105 electrical degrees, in order to insure that the protective relay will not operate on normal load current values. As illustrated by FIGS. 6 and 8, the coincidence output is shortened for normal load current values due to the product ($I_L Z_R$) being out of phase with $V_{POL}$. The difference signal is shifted substantially into phase with the voltage polarizing signal $V_{POL}$ during a fault condition.

Referring now to FIG. 7, there is shown a graph which may be considered to summarize the operation of the protective relay of the present invention under the conditions where the timer setting and the level detector settings have been coordinated to allow a sensitivity to fault current approximately twice that of the sensitivity to load current for close-in faults, or, in other words, faults occurring near the relay location. The conditions in FIG. 7 may be considered typical settings of level detector 34 and characteristic timer 60. The normal maximum line current under maximum load conditions is shown by the horizontally dashed line marked $I_L$. Fault current $I_F$ and the fault current required to operate the trip control circuit 64 are plotted versus the ratio ($Z_F/Z_R$), which is the ratio of the fault impedance $Z_F$ to the replica impedance $Z_R$, as that ratio increases from zero to one. The maximum ratio of fault impedance to replica impedance ($Z_F/Z_R$) to which the protective relay circuit of the present invention will respond is marked along the bottom axis of the graph. The protective relay circuit of the present invention will operate for values of fault current $I_F$ to the left of the point marked ($Z_F/Z_R)_{MAX}$, but will not operate for values of fault current $I_F$ to the right of the point marked ($Z_F/Z_R)_{MAX}$.

The present invention may be embodied in other specific forms without departing from the spirit or essential attributes thereof, and, accordingly, reference should be made to the appended claims, rather than to the foregoing specification as indicating the scope of the invention.

What is claimed as new and desired to be secured by Letters Patent of the United States is:

1. A protective relay circuit for providing a combination distance and overcurrent relay function for controlling the trip coil of a circuit breaker protecting an alternating current power transmission line, comprising:
   difference circuit means for producing a difference signal proportional to the difference between a signal proportional to an a-c power line current multiplied by a preselected constant reference impedance and a signal proportional to line voltage;
   an alternating current level detector responsive to the difference signal from said difference circuit means for producing an output signal when said difference signal exceeds a predetermined threshold value representative of a preselected parameter of said power line;
   means for generating a voltage polarity signal from a line voltage signal of said alternating current power transmission line;
   coincidence detector means for producing a coincidence signal output in response to detecting coincidence between the output of said alternating current level detector and the voltage polarity signal;
   coincidence-responsive means for receiving said coincidence signal output and being operative, when enabled, to effect operation of said trip coil in response to a coincidence signal output of a predetermined minimum duration; and
   said protective relay circuit permitting production of an effective coincidence signal output only if said difference signal exceeds said predetermined threshold value.

2. A protective relay circuit in accordance with claim 1 wherein said coincidence-responsive means includes characteristic timer means, said characteristic timer means producing a signal output for use in controlling the trip coil of the circuit breaker only in response to said predetermined minimum time duration coincidence signal output of said coincidence detector means.

3. A protective relay circuit in accordance with claim 2 wherein said characteristic timer means maintains its signal output for a predetermined period of time once a signal output is generated.

4. A protective relay circuit in accordance with claim 2 wherein said protected alternating current power transmission line includes series capacitor compensation with a voltage breakdown device connected across the capacitor, said level detector producing an output when the difference signal exceeds a predetermined value which is a function of the capacitor voltage at which said voltage breakdown device breaks down.

5. A protective relay circuit in accordance with claim 2 wherein said protected alternating current power transmission line includes series capacitor compensation with a voltage breakdown device connected across the capacitor, said level detector producing an output signal when said difference signal exceeds a value corresponding to the breakdown voltage of said breakdown device.

6. A protective relay circuit in accordance with claim 2 wherein said protected alternating current power transmission line includes series capacitor compensation with a spark gap protective device connected across the capacitor, said alternating current level detector producing an output signal when the difference signal from said difference circuit exceeds a value correponding to the breakdown voltage of the spark gap.

7. A protective relay circuit in accordance with claim 2 in which said characteristic timer means is set to detect coincidence for less than 90 electrical degrees, and said level detector is adjusted to produce an output signal only for difference signals exceeding a value which corresponds to normal load current multiplied by the reference impedance.

8. A protective relay circuit in accordance with claim 1 wherein said alternating current level detector includes a plurality of voltage breakdown devices connected in series.

9. A protective relay circuit in accordance with claim 1 wherein said alternating current level detector includes at least one pair of inverse parallel connected diodes.

10. A protective relay circuit in accordance with claim 1 wherein said coincidence detector means includes an AND gate.

11. A protective relay circuit in accordance with claim 1 wherein said difference circuit means includes means for providing amplification.

12. A protective relay circuit in accordance with claim 11 wherein the gain of said amplification means of said difference circuit means is adjustable.

13. A protective relay circuit for providing a combination distance and overcurrent relay function for controlling the trip coil of a circuit breaker protecting an alternating current power transmission line, comprising:
first means for coupling to the line and responsive to line voltage for developing first and second reference voltages representative of the line voltage and having a certain phase relation thereto;
second means for coupling to the line and responsive to line current for developing a representative voltage related to the line current by a predetermined constant impedance and having a certain phase relation thereto;
summing means for summing said representative voltage related to the line current by the predetermined constant impedance and said first reference voltage representative of the line voltage to produce a difference signal output;
threshold means for receiving the difference signal output of said summing means, said threshold means providing a signal output only when said difference signal output of said summing means exceeds a selected predetermined threshold value representative of a preselected parameter of said power line;
means responsive to said second reference voltage represetative of the line voltage for providing a voltage polarizing signal indicative of the direction of the fault location with respect to said relay;
coincidence detector means for producing a coincidence signal output in response to detecting coincidence between the output of said threshold means and the voltage polarizing signal;
coincidence-responsive means for receiving said coincidence signal output and being operative, when enabled, to effect operation of said trip coil in response to a coincidence signal output of a predetemined minimum duration; and
said protective relay circuit permitting production of an effective coincidence signal output only if said difference signal exceeds said predetermined threshold value.

14. A protective relay circuit in accordance with claim 13 wherein said coincidence-responsive means includes characteristic timer means, said characteristic timer means producing a signal output for use in controlling the trip coil of the circuit breaker only in response to said predetermined minimum time duration coincidence signal output of said coincidence detector means.

15. A protective relay circuit in accordance with claim 14 wherein said characteristic timer means maintains its signal output for a predetermined period of time once a signal output is generated.

16. A protective relay circuit in accordance with claim 14 wherein said protected alternating current power transmission line includes series capacitor compensation with a voltage breakdown device connected across the capacitor, said threshold means producing an output when said difference signal output exceeds a predetermined value which is a function of the capacitor voltage at which said voltage breakdown device breaks down.

17. A protective relay circuit in accordance with claim 14 wherein said protected alternating current power transmission line includes series capacitor compensation with a voltage breakdown device connected across the capacitor, said threshold means producing an output when said difference signal output exceeds a value corresponding to the breakdown voltage of said breakdown device.

18. A protective relay circuit in accordance with claim 14 wherein said protected alternating current power transmission line includes series capacitor compensation with a spark gap protective device connected across the capacitor, said threshold means producing an output when said difference signal output of said summing means exceeds a value corresponding to the breakdown voltage of said spark gap.

19. A circuit in accordance with claim 14 in which said characteristic timer is set to detect coincidence for less than 90 electrical degrees, and said threshold means is adjusted to produce a signal output only for summing means outputs exceeding a value corresponding to normal load current multiplied by said predetermined constant impedance.

20. A protective relay circuit in accordance with claim 13 wherein said threshold means includes a plurality of voltage breakdown devices connected in series.

21. A protective relay circuit in accordance with claim 13 wherein said threshold means includes at least one pair of inverse parallel connected diodes.

22. A protective relay circuit in accordance with claim 13 wherein said coincidence detector means includes an AND gate.

23. A protective relay circuit in accordance with claim 13 wherein said summing means includes means for providing amplification.

24. A protective relay circuit means in accordance with claim 23 wherein the gain of said amplification means of said summing means is adjustable.

* * * * *